Aug. 26, 1952  G. MUFFLY  2,608,602
DETECTING DEVICE
Filed Aug. 9, 1946  3 Sheets-Sheet 1
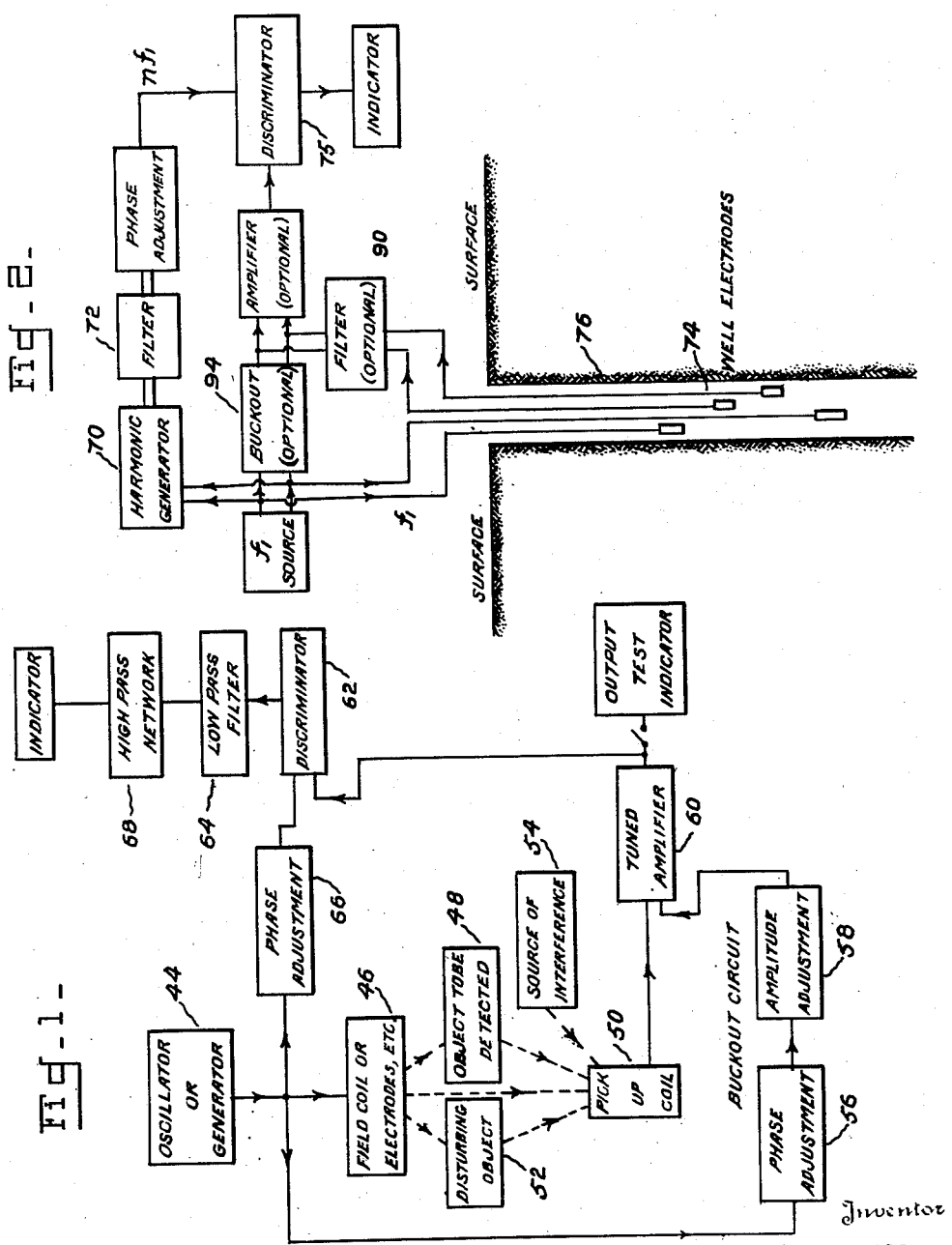
Inventor
Gary Muffly
By A. M. Houghton
his Attorney

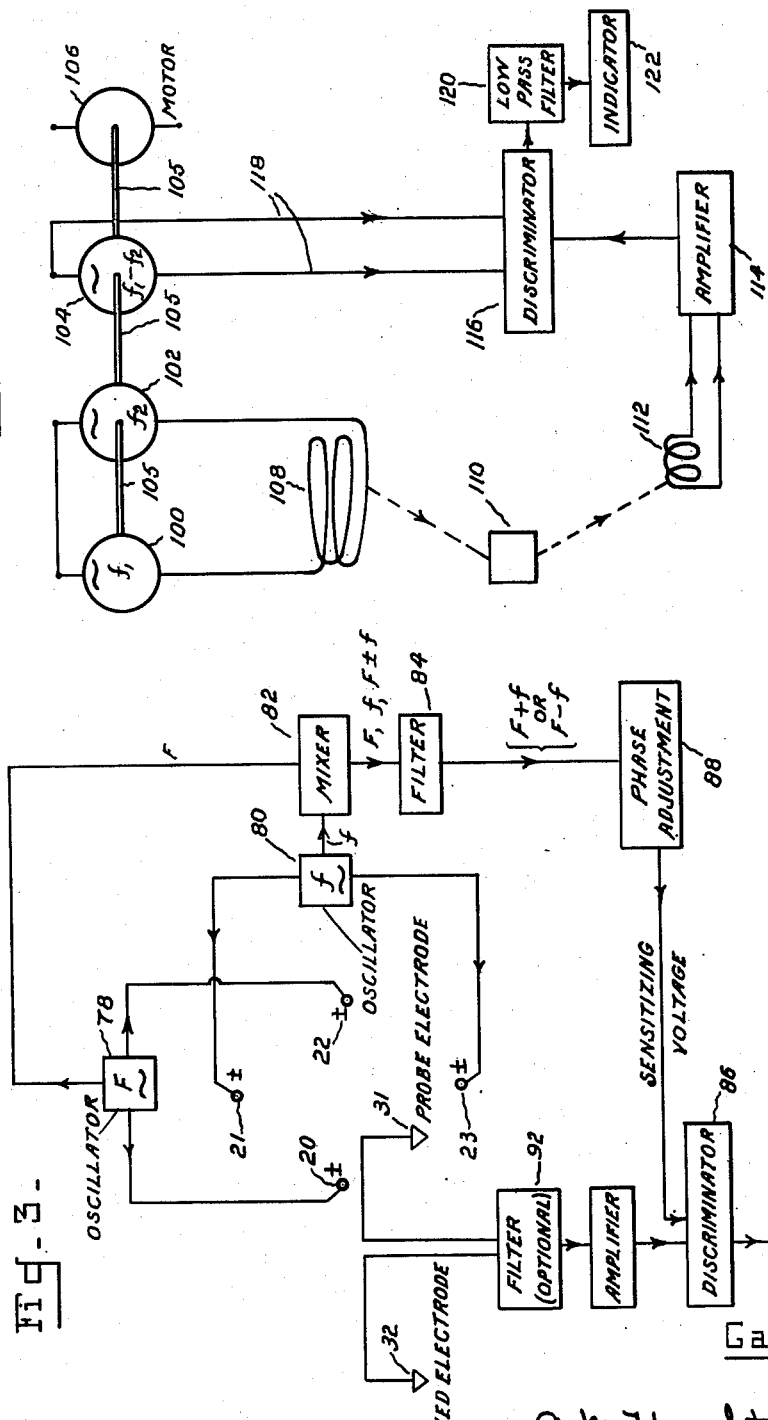

Aug. 26, 1952     G. MUFFLY     2,608,602
DETECTING DEVICE
Filed Aug. 9, 1946     3 Sheets-Sheet 3
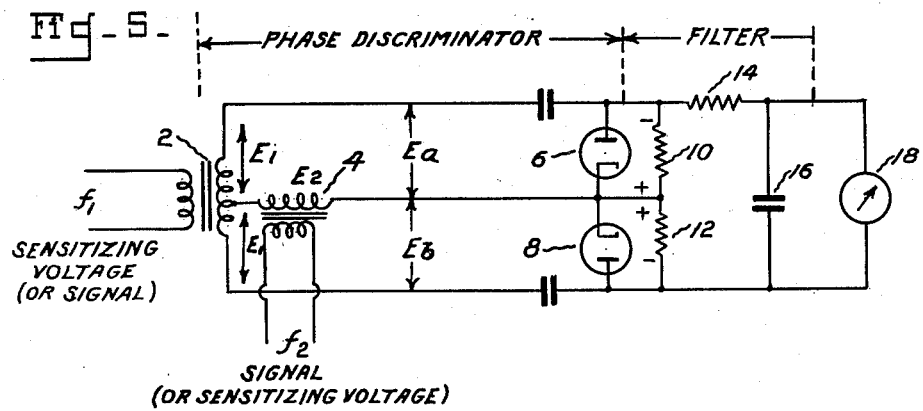
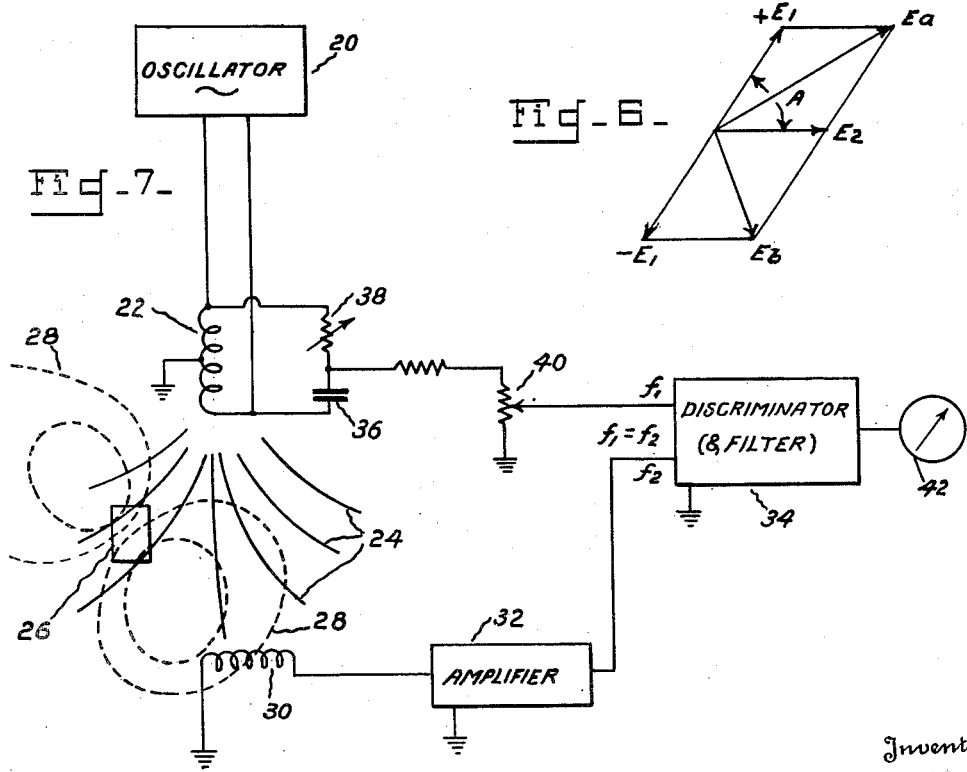
Inventor
Gary Muffly
By A. M. Houghton
his Attorney Patented Aug. 26, 1952

2,608,602

UNITED STATES PATENT OFFICE 2,608,602

DETECTING DEVICE

Gary Muffly, Penn Township, Allegheny County, Pa., assignor to Gulf Research & Development Company, Pittsburgh, Pa., a corporation of Delaware Application August 9, 1946, Serial No. 689,462

15 Claims. (Cl. 175—182)

This invention relates to methods and apparatus for use in electrical prospecting, well logging, and metal detection.

An object of the invention is to provide an electrical metal detection device which will detect metal objects and bodies of metal without interference from electrical disturbances.

Another object of the invention is to provide an electrical metal detection device having a circuit which can be adjusted to have a band width of a fraction of a cycle per second, and includes a phase-sensitive detector circuit in which maximum response occurs under zero-beat in-phase conditions, response to any frequency other than the exactly correct one being in the form of a beat frequency which may be smothered out by means of electrical or mechanical lag in the output circuit or indicating device, with the result that only the very lowest beat frequencies corresponding to small frequency separations are transmitted or indicated.

A further object of the invention is to provide an electrical prospecting device employing alternating current, and having sensitivity to specified frequencies only, with its effective band width depending on the suppression of beat effects of interfering frequencies by the indicating device.

Still another object of the invention is to provide an electromagnetic well logging device, in which the apparatus can be mounted in fixed relationship so that indications or changes of indication represent effects of strata, lost tools, casing, or the like, rather than errors such as may occur in surface prospecting due to inaccurate placement of coils or electrodes.

Other objects and advantages of the invention will become apparent from the following description of preferred embodiments thereof as illustrated in the accompanying drawings, and in which, Figure 1 is a block diagram of a system according to the invention, Figure 2 is a schematic and block diagram of a system according to the invention, and adapted particularly for well logging, Figure 3 is a diagram of a modified system according to the invention, Figure 4 is a diagram of a simple detecting circuit of general utility, according to the invention, and adapted particularly for metal detection, well logging and the like, Figure 5 is a schematic diagram of a discriminator circuit made use of in the invention, Figure 6 is a vector diagram illustrating the phase sensitivity of the circuit shown in Figure 5, and Figure 7 is a diagram illustrating the application of the invention to the detection of metal objects and bodies of metal or ore.

Reference is now had to the drawings, in which like reference characters denote similar parts throughout the several figures. Figures 5 and 6 may advantageously be considered as showing the discriminator circuit which is used in applications shown in the other figures.

The phase sensitivity of the device shown in Figure 5 is due to the inclusion therein of an arrangement of a center tapped coil 2 and a simple two terminal coil 4 connected in T fashion. The signal $f_1$ being received or detected is applied to either one of the coils 2 or 4, usually by induction, and similarly a sensitizing frequency $f_2$ is applied to the other coil to make the device responsive to that one frequency. In metal detecting and similar applications where the received signal comes indirectly from a local oscillator or alternator, the sensitizing frequency may be delivered directly from this local oscillator to the discriminator, with the phase and amplitude adjusted to local values.

Figure 6 is a vector diagram illustrating the phase sensitivity of the circuit shown in Figure 5. Figure 6 represents as vectors the voltages applied to the diodes 6 and 8 of Figure 5. Two equal voltages, obtained from the center-tapped coil 2, are shown as $E_1$ in Figure 6, the two voltages being shown 180° out of phase as seen by the diodes 6 and 8 which have their cathodes connected to the center tap of coil 2. Vector $E_2$ of Figure 6 is the voltage of coil 4. The three vectors of Figure 6, namely ($+E_1$, $-E_1$, and $E_2$), combine to make two new voltages $E_a$ and $E_b$. These voltages are separately rectified by diodes 6 and 8 which are arranged for peak rectification and consequently produce rectified voltages approximately equal to the peak values of $E_a$ and $E_b$ across resistors 10 and 12. These rectified voltages have opposite polarity as indicated in Figure 5. Consequently the output of the circuit depends on the difference in magnitude of $E_a$ and $E_b$. It can be seen by inspection of Figure 6 that this difference will vary with the phase angle A between the vectors. When A is zero, $E_a$ will be $2E_2$ greater than $E_b$; with A equal to 90 degrees, $E_a$ equals $E_b$, giving zero output; at 180 degrees the difference will be $-2E_2$ and so forth. To provide the maximum output of $2E_2$, $E_1$ and $E_2$ should be in phase.

This condition is realized in the discriminator, Figure 5, by providing a sensitizing frequency $f_1$ of the desired phase, and, of course, of the exact frequency which it is desired to detect in the signal circuit of $f_2$. Suppose now that an interfering voltage is mixed in with $f_2$. If its frequency is only slightly different from that of $f_1$ it will beat with $f_1$. Phase angle A will be continually changing so that the output will swing alternately plus and minus at the beat frequency. The wave shape of the beat frequency can be computed trigonometrically from Figure 6 and varies from an almost pure cosine wave for extreme inequality of $E_1$ and $E_2$ to a more peaked, almost triangular wave shape when $E_1$ and $E_2$ are equal.

This beat frequency wave is smothered out, unless it is extremely slow, by the electrical low-pass filter consisting of a resistor 14 and condenser 16. The indicating device 18 may also have enough lag to attenuate the higher-frequency beats. The band width of the circuit can be made as narrow as desired by increasing condenser 16 or resistor 14. The drop-off of response to incoming frequencies on either side of the peak value will be practically the same, cycle for cycle, as the attenuation of the beat frequencies in the apparatus following the rectifier. Any tuning of the input coils is usually inconsequential as far as over-all selectivity is concerned because the best coils tune very broadly compared to the rest of the circuit.

It should be noted that in theory either frequency $f_1$ and $f_2$ alone will produce no output because of the balanced arrangement of the circuit. The practical realization of this balanced condition is ordinarily satisfactory if the circuit elements are reasonably well balanced. It is helpful to work the diodes at a fairly good signal level of at least several volts, and as nearly as possible as peak rectifiers. In this way the desired and interfering components of the signal voltage add directly rather than as averages, root mean squares, or the like, thus preventing masking or loss of sensitivity due to the presence of strong interfering components.

Another interesting property of the circuit Figure 5 is that $f_1$ and $f_2$ may be interchanged. The sensitizing voltage which is used to control the selectivity is usually made at least as large as the maximum signal amplitude it is desired to receive, because the output of the circuit is limited by the smaller of the two applied voltages. For example, if sensitizing voltage $E_1$ in Figure 6 had been chosen smaller than signal voltage $E_2$, the peak output would then have been $2E_1$ instead of $2E_2$. This limiting effect is of value in suppressing continuous-wave interference that is stronger than the desired signal, it being only necessary to set the sensitizing voltage at the desired limiting amplitude.

Figure 7 represents an application of the discriminator to detecting metal objects. Similar arrangements can be used in electrical prospecting to locate conductive or magnetic ore bodies. Many other applications will be apparent in connection with sensitive instruments which depend on balancing out a locally applied alternating current. Sensitive strain or deflection gauges, profile meters for finished surfaces and the like often are of this type, and may well use this circuit to eliminate disturbances.

In Figure 7 a generator or oscillator 20 delivers alternating current to a field coil 22. This energizes the surrounding space with magnetic lines of force 24. If a metal object 26 is brought into the field, it will be energized so that it generates a secondary magnetic field as indicated by the dotted lines of force 28. The lines 28 will induce in pickup coil 30 a component of voltage that may be detected as an indication of the presence of object 26. The lines 28 may be due to magnetization or eddy currents set up in the object.

Coil 30 is turned at right angles to the field of the field coil 22 or approximately so to get a low voltage, if not zero, induced in it. Otherwise the direct coupling between the coils may completely mask the relatively small component due to an object of small size, or one at a distance from the coils. Since the detected voltages may be small in arrangements of this type, interference picked up from other electrical apparatus is apt to be very serious. Raising the power of source 20 is of some help in combating interference, but this may introduce problems of heat dissipation, cost, weight of apparatus, or the like. An improvement of 100 to 1 in the desired signal amplitude by this means would require 10,000 times the power input, which would ordinarily be impractical. By use of the circuit shown in Figure 5, however, it is possible to reduce the interference by 100 to 1 and thereby attain the same end economically.

Pickup coil 30 feeds amplifier 32, which in turn provides the $f_2$ signal voltage for the discriminator circuit 34 which has been described for Figure 5. Sensitizing voltage is also fed to the discriminator through electrical connections from oscillator 20 by way of field coil 22. The connecting network includes a phase shifter and an attenuator. The phase shifter includes condenser 36 and variable resistor 38 which may be set to give any desired phase within a range of nearly 180 degrees. This is a desirable feature to make it possible to compensate for phase shifts caused by the object 26 and amplifier 32. Variable resistor 40 may be used to provide a suitable amplitude of the sensitizing voltage $f_1$. Discriminator circuit 34 is of the same type as shown in Figure 5, and indicator 42 may be a vacuum tube voltmeter, preferably of the recording type.

Figure 1 is a block diagram which is a modification of the circuit shown in Figure 7. This block diagram shows a buck-out circuit and other details. There is an oscillator or generator 44 connected to a field coil 46 for energizing an object 48 to be detected, whereby a secondary magnetic field is generated, as already described for Figure 7, the secondary field serving to induce in the pickup coil 50 a component of voltage that may be detected as an indication of the object 48. Disturbing object 52 which is stationary with respect to coil 46 is also affected by the field from coil 46 in the same manner as the object 48, and a source of interference 54 may also be present to contribute its effect on the pickup coil 50. The source of interference 54 may be any neighboring apparatus which produces a varying magnetic field at coil 50 so as to induce therein a voltage which interferes with the detection of object 48. Such interference is ordinarily produced by nearby motors, lighting circuits, power transformers, etc. which produce stray fields. This interference may be in the nature of background noise or "hash" and is of a frequency materially different from the operating frequency of oscillator 44. The pickup coil 50 is disposed substantially perpendicular to the primary field from coil 46 to eliminate this strongest member of the unwanted field components. The effect of the remaining oscillator frequency components adds up to a single voltage in the coil 50 of a definite phase and frequency. This residual voltage may be minimized by adjusting the angle of the pick-up coil 50 slightly relative to the field coil so that one component such as that of object 52 is bucked out more or less by another component such as the primary field. However, to make the bucking out process more perfect, it is necessary to cancel out the residual voltage by taking voltage from the oscillator and field coil circuit, adjusting it to the desired phase angle by phase adjustment 56, reducing it to the necessary amplitude by amplitude adjustment 58, and then feeding it and the output of the pickup coil into the tuned amplifier 60. By thus adjusting the buck-out circuit, the remaining effects of a fixed disturbing object 52 can be eliminated. To eliminate voltages due to stray fields of other electrical apparatus in the vicinity such as 54, reliance is had upon the frequency selectivity of the tuned amplifier 60 and the discriminator 62, the amplifier providing a band width of about five cycles, and the discriminator providing a band width of about one-fourth of a cycle. Amplifier selectivity may be obtained by an inverse feedback network around three stages.

The use of this extreme selectivity would seem to demand equivalent stability of the oscillator and the discriminator, but this is happily avoided by the fact that the discriminator response inherently follows any drift of the oscillator because it is sensitized to the oscillator frequency by the oscillator itself. The discriminator circuit has already been described for Figure 5. The discriminator, followed by the low-pass filter 64 or low-pass indicator, gives the effect of extremely sharp tuning without putting stringent requirements on the frequency stability of the oscillator, and does not require elaborate filter elements.

The phase adjustments of the oscillator voltage that is used to sensitize the discriminator is accomplished at 66. This can be set to reject components of an undesired phase or to make the device selectively sensitive to a desired phase. For example, in metal detection, where there is relatively rapid motion between the coil and the material being inspected, magnetic and purely conductive metals will produce components of dissimilar phase, and a certain degree of discrimination can be had against either type of object. In such applications, the high-pass network 68 eliminates direct current and slow drifts from the indicator, thus making the device self adjusting to some extent. However, the high-pass network 68 is omitted for purposes such as measuring steady state alternating current values in fixed electrical prospecting setups.

For surface electrical prospecting, the following modifications may be made of the arrangements shown in Figure 1. The field and pickup coils may either or both be replaced by electrodes. The high-pass network and the output test indicator should be eliminated. The disturbing effect, or object 52, and the object 48 to be detected become one entity, namely the anomaly being studied. Provisions may be added for accurately positioning the coils or electrodes in the same relationship on each setup. This requires careful surveying, leveling, and orienting.

A valuable application of this detecting scheme is in electromagnetic well logging devices. Here the apparatus can be mounted in fixed relationship so that indications or changes of indication represent effects of strata, lost tools, casing, or the like, rather than errors such as may occur in surface prospecting due to inaccurate placement of coils or electrodes. In such applications, the discriminator as already described herein, is a particularly effective means for rejecting unwanted components, and the complete system of Figure 1 is particularly sensitive in detecting small effects in the face of disturbance plus such imperfect adjustment of the buckout arrangement as may exist.

The arrangement of Figure 1 is, of course, directly applicable to such things as detecting foreign metallic objects in lumber or other high resistance materials, and can also be carried over an area as a unit to locate buried pipe, land mines, and other metal bodies. Its use of separate field and pickup coils and its buck-out circuit are features which greatly reduce the unwanted input to the discriminator. They increase the usable sensitivity by a tremendous factor because the voltage picked up can be amplified a great deal without overloading the discriminator with the direct signal from the field coil.

The discriminator circuit is also an ideal means for separating and indicating harmonics or modulation products in connection with the use of the disclosures of Patents Nos. 2,354,535 and 2,364,159 on electrical prospecting and electrical well logging. For this purpose the circuit requires new elements to create a sensitizing voltage of proper phase and frequency to make the discriminator pick out a selected harmonic or modulation product rather than an originally applied frequency.

Figure 2 shows diagrammatically how this can be done in well logging, using some harmonic of the applied frequency. The harmonic generator 70 may be arranged to generate all harmonics, or perhaps all odd or even harmonics. The filter 72 may be set to the third harmonic, for example. Or, one harmonic can be selected to get one log while the electrodes indicated generally at 74 are lowered into the well 76, and another harmonic selected to get another log while the electrodes are raised back to the surface. There would be quite a difference in the logs for even and odd harmonics, such as the second and third since they represent different types of non-linearity of the electrical properties of the rock strata.

Figure 3 shows how one embodiment of the disclosure of Patent No. 2,354,535, namely its Figure 1, may be modified in accordance with the present invention. The two applied frequencies F and $f$, from oscillators 78 and 80 respectively, are mixed in mixer 82 to get a modulation product of the sum or difference frequency, which is selected by a filter 84 and put into the discriminator 86 in the proper phase as adjusted by phase adjustment 88 to sensitize it to the desired component. Oscillators 78 and 80 are similar to oscillators 24 and 25 of Figure 1 of the patent, and electrodes numbered 20, 21, 22, 23, 31 and 32 are the same as the similarly numbered electrodes of the patent.

In the present Figures 2 and 3, the discriminators shown at 75 and 86 in the respective views, are in effect the filters of the said previous patents. A filter is still required, but it is now essential only in the sensitizing voltage circuit as at 72 in Figure 2 and 84 in Figure 3. It does not need to be as highly selective as before. If this filter does pass some of the unwanted harmonics, this merely means that the discriminator will have some sensitivity to the unwanted harmonics. It will not be sensitive to random earth currents of stray frequencies coming from alternating current power systems or unknown sources. An optional filter can be added in the pickup electrode circuits, as at 90 in Figure 2 and at 92 in Figure 3, in the event trouble is encountered from undesired responses.

Buck-out circuits can also be used in the apparatus, as at 94 in Figure 2 and similarly in the circuit of Figure 3, but they are not essential because the frequencies that would be bucked out would be F, f, or $f_1$, which are different from the signal frequency and can be rendered harmless by a small amount of filtering in the event that they do cause trouble.

The device as disclosed can be used for detecting magnetic objects such as iron or steel in the frequency range up to several hundred or a few thousand cycles. It becomes relatively more sensitive to non-magnetic conductors such as copper or aluminum above a few thousand cycles. If the frequency is raised still higher, into the radio frequency range, it can detect non-conductive bodies such as wood, due to their dielectric effects.

Figure 4 shows a simple detecting circuit of general utility for metal detection, well logging, and the like. Three generators 100, 102, and 104 are shown rigidly driven on a common shaft 105 by a common motor 106. As an example, 100 may be a 10-pole alternator producing a 500-cycle current $f_1$, 102 may be a 12-pole machine producing a 600-cycle current $f_2$, and 104 may be a 2-pole machine producing a 100-cycle current that is $f_1-f_2$. Frequencies $f_1$ and $f_2$ from alternators 100 and 102 respectively, energize the area around field coil 108 which is connected to the said alternators, thus setting up magnetic flux, eddy currents, or dielectric stress in object 110.

If object 110 is of a material like copper, or aluminum having linear electrical properties, any secondary fields set up by its presence will be the same frequency as $f_1$ or $f_2$, and there will be no detection. However, if it is a material like iron, various minerals, or a poor dielectric having nonlinear electrical effects such as variable permeability or nonlinear resistivity, the combination of $f_1$ and $f_2$ will generate distortion components such as harmonics or sum and difference frequencies. These components may be picked up by means such as coil 112, and may be amplified, if necessary, at 114. The need for amplification depends on the available coil arrangement, power available, and the size of object to be detected. If a high degree of detection sensitivity is required, the amplifier may be tuned to the modulation product desired in order to suppress effects of $f_1$, $f_2$ or any stray frequencies.

Discriminator 116 is sensitized by the frequency $f_1-f_2$ which is delivered from alternator 104 through circuit 118 to the discriminator. Coil 112 and the amplifier, if used, must be designed to deliver this same frequency to the discriminator, as it is not sensitive to any other frequency. Low-pass filter 120 and any inertia in indicator 122 tend to eliminate response from any frequency differing from the sensitizing frequency.

Possible variations of the device shown in Figure 4 will occur to those skilled in the art. As one example, generator 104 can be a 22-pole machine generating the sum rather than the difference of $f_1$ and $f_2$, that is, 1100 cycles. Then amplifier 114 must deliver the 1100-cycle distortion component to the discriminator. Or, $f_2$ may be omitted and generator 104 may be chosen to generate a harmonic of $f_1$ such as the third harmonic, that is, 1500 cycles. This is similar but not quite as desirable as a sum or difference frequency because generator 100 may also produce some third harmonic. This may show up as a steady response even in the absence of object 110. Such a steady response can be subtracted from the indications or bucked out electrically, but this may not always be convenient.

Although I have described selected embodiments of my invention in specific terms, it is to be understood that various changes in materials, arrangement and other details, will readily occur to those skilled in the art, and accordingly I do not wish to be limited by the details of the disclosure herein, but only by the spirit and scope of the claims as appended hereto.

What I claim is:

1. Means for detecting an object by its disturbing effect upon an electromagnetic field, comprising an alternating current source, field-creating means excited by the source to set up a field in a zone of interest, separate pickup means fixed in a definite position with respect to said field-creating means and adjacent said zone of interest for receiving field components due to the presence of disturbing objects in the zone of interest, a phase-sensitive discriminator type rectifier circuit fed from said pickup means and sensitized by said source, and an indicator for the output of the discriminator.

2. Means for detecting an object by its disturbing effect upon an electromagnetic field comprising an alternating current source, field-creating means excited by the source to set up a field in a zone of interest, separate pickup means fixed in a definite position with respect to said field-creating means and adjacent said zone of interest for receiving field components due to the presence of disturbing objects in the zone of interest, a phase-sensitive discriminator type rectifier circuit fed from said pickup means and sensitized by said source, an indicator for the output of the discriminator, and a low-pass filter in the indicator circuit.

3. Means for detecting an object by its disturbing effect upon an electromagnetic field comprising an alternating current source, field-creating means excited by the source to set up a field in a zone of interest, separate pickup means fixed in a definite position with respect to said field-creating means and adjacent said zone of interest for receiving field components due to the presence of disturbing objects in the zone of interest, a phase-sensitive discriminator type rectifier circuit fed from said pickup means and sensitized by said source, an indicator for the output of the discriminator, and means for adjustment of the phase of the sensitizing voltage.

4. Means for detecting an object by its disturbing effect upon an electromagnetic field, comprising an alternating current source, field-creating means excited by the source to set up a field in a zone of interest, separate pickup means fixed in a definite position with respect to said field-creating means and adjacent said zone of interest for receiving field components due to the presence of disturbing objects in the zone of interest, a phase-sensitive discriminator type rectifier circuit fed from said pickup means and sensitized by said source, a circuit with phase and amplitude adjustments to annul direct effects from the field-creating means to the pickup means, an indicator for the output of the discriminator, and a low-pass filter in the indicator circuit.

5. Means for electrical prospecting comprising an alternating current source of low frequency, field-creating means excited by the source to set up a field in a portion of the earth's crust, separate pickup means accurately placed in a known position with respect to the field-creating means and adjacent said portion of the earth's crust for receiving field components due to irregularities therein, a phase-sensitive discriminator type rectifier circuit fed from said pickup means and sensitized by said source, and an indicator for the output of the discriminator.

6. Means for electrical prospecting comprising an alternating current source of low frequency, field-creating means excited by the source to set up a field in a portion of the earth's crust, separate pickup means accurately placed in a known position with respect to the field creating means and adjacent said portion of the earth's crust for receiving field components due to irregularities therein, a phase-sensitive discriminator type rectifier circuit fed from said pickup means and sensitized by said source, an indicator for the output of the discriminator, a low-pass filter in the indicator circuit, and means for adjustment of phase of the sensitizing voltage.

7. Means for electrical prospecting comprising an alternating current source of low frequency, field-creating means excited by the source to set up a field in a portion of the earth's crust, separate pickup means accurately placed in a known position with respect to the field-creating means and adjacent said portion of the earth's crust for receiving field components due to irregularities therein, a phase-sensitive discriminator type rectifier circuit fed from said pickup means and sensitized by said source, means for adjusting the phase of the sensitizing voltage, an indicator for the output of the discriminator, and a low-pass filter in the indicator circuit.

8. Means for logging variations in electrical characteristics of formations adjacent a well bore, comprising an alternating current source, separate field-creating and field-pickup means adapted to be passed through the well bore in fixed geometrical relationship, means for applying output of the source to the field-creating means, a phase-sensitive discriminator type rectifier circuit fed from said pickup means and sensitized by said source, and exhibiting means for the output of the discriminator.

9. Means for logging variations in electrical characteristics of formations adjacent a well bore, comprising an alternating current source, separate field-creating and field-pickup means adapted to be passed through the well bore in fixed geometrical relationship, means for applying output of the source to the field-creating means, a phase-sensitive discriminator type rectifier circuit fed from said pickup means and sensitized by said source, exhibiting means for the output of the discriminator, and a low-pass filter in the exhibiting means circuit.

10. Means for logging variations in electrical characteristics of formations adjacent a well bore, comprising an alternating current source, separate field-creating and field-pickup means adapted to be passed through the well bore in fixed geometrical relationship, means for applying output of the source to the field-creating means, a phase-sensitive discriminator type rectifier circuit fed from said pickup means and sensitized by said source, exhibiting means for the output of the discriminator, a low-pass filter in the indicator circuit, and means for adjustment of phase of the sensitizing voltage.

11. A method of detecting electromagnetically nonlinear bodies, comprising the steps of applying alternating current field of at least one frequency to a region where such a body may be expected so that at least one distortion component will be produced by the body, generating an auxiliary alternating current containing the frequency of the distortion component, maintaining a definite phase relationship between the auxiliary alternating current and the applied field, applying the auxiliary alternating current to a phase-sensitive discriminator type rectifier circuit to sensitize said circuit to the distortion component, picking up the distortion component in the region surrounding the body, applying the distortion component to the discriminator circuit, and observing the output of the discriminator circuit.

12. A method of detecting electromagnetically nonlinear bodies, comprising the steps of applying alternating current field of at least one frequency to a region where such a body may be expected so that at least one distortion component will be produced by the body, generating an auxiliary alternating current containing the frequency of a distortion component, maintaining a definite phase relationship between the auxiliary alternating current and the applied field, rejecting from said auxiliary alternating current any components of applied field frequency, applying the remainder of the auxiliary alternating current to a phase-sensitive discriminator type rectifier circuit to sensitize said circuit to the distortion component, picking up the distortion component in the region surrounding the body, applying the distortion component also to the discriminator circuit, and observing the output of the discriminator circuit.

13. A method of detecting electromagnetically nonlinear bodies comprising the steps of applying alternating current field of at least one frequency to a region where such a body may be expected so that at least one harmonic will be produced by the body, generating an auxiliary alternating current containing the frequency of the harmonic, maintaining a definite phase relationship between the auxiliary alternating current and the applied field, applying the auxiliary alternating current to a phase-sensitive discriminator type rectifier circuit to sensitize said circuit to the harmonic, picking up the harmonic in the region surrounding the body, applying the harmonic to the discriminator circuit, and observing the output of the discriminator circuit.

14. A method of detecting electromagnetically nonlinear bodies comprising the steps of applying alternating current field of at least one frequency to a region where such a body may be expected so that at least one distortion component will be produced by the body, generating an auxiliary alternating current containing the frequency of a distortion component, maintaining a definite phase relationship between the auxiliary alternating current and the applied field, rejecting from said auxiliary alternating current any components of applied field frequency, applying the remainder of the auxiliary alternating current to a phase-sensitive discriminator type rectifier circuit to sensitize said circuit to the distortion component, picking up the distortion component in the region surrounding the body, applying the distortion component also to the discriminator circuit, and observing the output of the discriminator circuit.

15. A method of detecting electromagnetically nonlinear bodies, comprising the steps of applying alternating current field of at least one frequency to a region where such a body may be expected so that at least one distortion component will be produced by the body, generating an auxiliary alternating current containing the frequency of the distortion component, maintaining a definite phase relationship between the auxiliary alternating current and the applied field, applying the auxiliary alternating current to a phase-sensitive discriminator-type rectifier circuit having low-pass filtering means in its output, to sensitize said circuit to the distortion component, picking up the distortion component in the region surrounding the body, applying the distortion component to the discriminator circuit, and observing the output of the discriminator circuit.

GARY MUFFLY.

REFERENCES CITED

The following references are of record in the file of this patent:

UNITED STATES PATENTS

| Number | Name | Date |
|---|---|---|
| 1,812,392 | Zuschlag | June 30, 1931 |
| 1,936,414 | Stone | Nov. 21, 1933 |
| 1,984,545 | Peterson | Dec. 18, 1934 |
| 2,093,512 | Bowen | Sept. 21, 1937 |
| 2,220,070 | Aiken | Nov. 5, 1940 |
| 2,225,348 | Mikelson | Dec. 17, 1940 |
| 2,242,312 | Machts | May 20, 1941 |
| 2,354,535 | Muffly | July 25, 1944 |
| 2,364,159 | Muffly | Dec. 5, 1944 |
| 2,375,776 | Evjen | May 15, 1945 |
| 2,375,778 | Evjen | May 15, 1945 |
| 2,393,717 | Speaker | Jan. 29, 1946 |
| 2,405,073 | Troell | July 30, 1946 |
| 2,429,216 | Ballman | Oct. 21, 1947 |
| 2,535,666 | Broding | Dec. 26, 1950 |

OTHER REFERENCES

"Locating Land Mines," Horni, Electronics Industries, Jan. 1945, pages 82, 83, 174, 175.